(12) United States Patent
Akula et al.

(10) Patent No.: US 11,652,522 B2
(45) Date of Patent: May 16, 2023

(54) METHODS AND APPARATUS FOR SRS ANTENNA SWITCHING IN CARRIER AGGREGATION

(71) Applicant: QUALCOMM Incorporated, San Diego, CA (US)

(72) Inventors: Prashanth Akula, Lake Bluff, IL (US); Alberto Rico Alvarino, San Diego, CA (US); Aamod Khandekar, San Diego, CA (US); Helena Deirdre O'Shea, San Diego, CA (US); Supratik Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/058,879

(22) Filed: Aug. 8, 2018

(65) Prior Publication Data

US 2019/0052328 A1 Feb. 14, 2019

Related U.S. Application Data

(60) Provisional application No. 62/544,648, filed on Aug. 11, 2017.

(51) Int. Cl.
*H04B 7/06* (2006.01)
*H04L 5/00* (2006.01)
(Continued)

(52) U.S. Cl.
CPC ............ *H04B 7/061* (2013.01); *H04L 5/001* (2013.01); *H04L 5/006* (2013.01); *H04L 5/0037* (2013.01);
(Continued)

(58) Field of Classification Search
CPC ..... H04B 7/061; H04L 5/0096; H04L 5/0037; H04L 5/0048; H04L 5/006; H04L 5/001
See application file for complete search history.

(56) References Cited

U.S. PATENT DOCUMENTS

| 8,824,976 B2 | 9/2014 | See |
| 8,953,699 B2 * | 2/2015 | Sayana ................ H04B 7/024 375/267 |

(Continued)

FOREIGN PATENT DOCUMENTS

| CN | 1694367 A | 11/2005 |
| CN | 104468030 A | 3/2015 |

(Continued)

OTHER PUBLICATIONS

Huawei, et al., "High Layer Impacts on SRS Carrier Based Switching for LTE", 3GPP Draft; R2-166632 High Layer Impacts on SRS Carrier based Switching for LTE, 3rd Generation Partnership Project (3GPP), Mobile Competence Centre, 650, Route Des Lucioles, F-06921 Sophia-Antipolis, vol. RAN WG2, No. Kaohsiung; Oct. 10, 2016-Oct. 14, 2016, Oct. 9, 2016 (Oct. 9, 2016), 6 Pages, XP051151124, Retrieved from the Internet: URL: http://www.3gpp.org/ftp/Meetings_3GPP_SYNC/RAN2/Docs/ [retrieved on Oct. 9, 2016].

(Continued)

*Primary Examiner* — Redentor Pasia
(74) *Attorney, Agent, or Firm* — Patterson+ Sheridan, L.L.P.

(57) ABSTRACT

Certain aspects of the present disclosure relate to communication systems, and more particularly, to improving performance for sounding reference signal (SRS) antenna switching in carrier aggregation (CA). A method is provided, that may be performed by a user equipment (UE) for wireless communications. The method includes determining one or more band combinations that share an antenna switch (Continued)

and sending a list of one or more bands in the one or more band combinations to a base station (BS). The BS receives the list and schedules the UE based on the received list.

30 Claims, 11 Drawing Sheets

(51) Int. Cl.
 *H04W 84/04* (2009.01)
 *H04W 88/08* (2009.01)
(52) U.S. Cl.
 CPC .......... *H04L 5/0048* (2013.01); *H04L 5/0096* (2013.01); *H04W 84/042* (2013.01); *H04W 88/08* (2013.01)

(56) References Cited

U.S. PATENT DOCUMENTS

| | | | |
|---|---|---|---|
| 9,369,250 B2* | 6/2016 | Liu | H04L 5/0048 |
| 9,537,555 B2 | 1/2017 | Gaal et al. | |
| 9,538,565 B2 | 1/2017 | He et al. | |
| 10,135,469 B2* | 11/2018 | Chang | H04L 5/0041 |
| 10,341,914 B2 | 7/2019 | Luo et al. | |
| 10,945,165 B2 | 3/2021 | Zhang et al. | |
| 11,218,892 B2* | 1/2022 | Kim | H04B 7/0486 |
| 2010/0069028 A1* | 3/2010 | Choi | H04B 7/0602 455/136 |
| 2010/0122845 A1 | 5/2010 | Guo et al. | |
| 2010/0234037 A1* | 9/2010 | Terry | H04L 5/003 455/450 |
| 2013/0010659 A1 | 1/2013 | Chen et al. | |
| 2013/0242911 A1 | 9/2013 | Heo et al. | |
| 2014/0235289 A1* | 8/2014 | Imamura | H04W 52/146 455/522 |
| 2015/0201326 A1* | 7/2015 | Kazmi | H04W 8/24 370/329 |
| 2017/0126382 A1 | 5/2017 | Chung et al. | |
| 2017/0289995 A1* | 10/2017 | Lin | H04W 72/0446 |
| 2017/0302419 A1* | 10/2017 | Liu | H04L 5/0082 |
| 2018/0159563 A1* | 6/2018 | Khlat | H01Q 5/50 |
| 2018/0167980 A1* | 6/2018 | Shi | H04W 72/02 |
| 2018/0191067 A1* | 7/2018 | Khlat | H04B 1/0064 |
| 2018/0323846 A1* | 11/2018 | Tsai | H04B 7/0617 |
| 2019/0028136 A1* | 1/2019 | Zhang | H01Q 5/50 |
| 2019/0141639 A1* | 5/2019 | Rahman | H04W 52/22 |
| 2019/0159080 A1* | 5/2019 | Zhang | H04W 36/0061 |
| 2019/0199555 A1* | 6/2019 | Munier | H04L 5/0051 |
| 2019/0229868 A1* | 7/2019 | Siomina | H04W 24/10 |
| 2019/0229954 A1* | 7/2019 | Kazmi | H04W 72/0446 |
| 2019/0245649 A1* | 8/2019 | Siomina | H04B 17/104 |
| 2019/0260487 A1* | 8/2019 | Kazmi | H04B 17/382 |
| 2019/0268185 A1* | 8/2019 | Wang | H04B 1/713 |
| 2019/0305918 A1* | 10/2019 | Siomina | H04L 5/001 |
| 2020/0204316 A1* | 6/2020 | Zhang | H04L 5/0007 |
| 2020/0228267 A1* | 7/2020 | Park | H04L 5/0094 |
| 2021/0083825 A1* | 3/2021 | Choi | H04L 1/06 |
| 2022/0109590 A1 | 4/2022 | He et al. | |

FOREIGN PATENT DOCUMENTS

| | | |
|---|---|---|
| CN | 104868984 A | 8/2015 |
| CN | 105340196 A | 2/2016 |
| WO | 2010033889 A2 | 3/2010 |
| WO | 2012116091 | 8/2012 |
| WO | 2013155305 A1 | 10/2013 |
| WO | 2015126916 | 8/2015 |

OTHER PUBLICATIONS

Huawei: List of Agreements for "SRS Carrier-Based Switching", 3GPP Draft; R1-1613787 SRS Switching Agreements, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 29, 2016 (Nov. 29, 2016), pp. 1-15, XP051191618, Retrieved from the Internet: URL: http://www.3gpp.org/ftp/tsg_ran/WG1_RL1/TSGR1_87/Docs/ [retrieved on Nov. 29, 2016].
International Search Report and Written Opinion—PCT/US2018/046097—ISA/EPO—dated Nov. 27, 2018.
Taiwan Search Report—TW107127804—TIPO—dated Sep. 1, 2021.
Taiwan Search Report—TW107127804—TIPO—dated Dec. 22, 2021.
ETSI MCC: "Draft Report of 3GPP TSG RAN meeting #75", Held in Dubrovnik, Croatia, May 3-Aug. 3, 2017, RP-170857, 3GPP tsg_ran\TSG_RAN, May 30, 2017, 189 Pages.
ETSI MCC: "Report of RAN #75 held", RP-171409, 3GPP TSG RAN meeting #76,3GPP tsg_ran\TSG_RAN, West Palm Beach, USA, Jun. 5-8, 2017, Jun. 9, 2017, 189 Pages.
Jingzhu S., et al., "Adaptive Small Cell Architecture Based on Smart Antenna", Journal Of Applied Sciences—Electronics and Information Engineering, DOI: 10.3969/j.issn.0255-8297.2015.04.002, Jul. 30, 2015.
Huawel, et al., "SRS Switching Among CCs and Bandwidth Parts", 3GPP Draft, R1-1709976, 3GPP TSG RAN WG1 NR Ad-Hoc Meeting, Qingdao, China, Jun. 27-30, 2017, 4 Pages.
NTT Docomo: "Status Report for RAN WG1 to TSG-RAN #76", 3GPP Draft, RP-170858, 3GPP TSG RAN #76, Florida, USA, Jun. 5-8, 2017, pp. 1-35.
Qualcomm Incorporated: "Discussion on SRS Design", 3GPP TSG RAN WG1 NR Ad-Hoc#2_NR_AH_1706, R1-1711174, Qingdao, P.R. China, Jun. 27, 2017-Jun. 30, 2017, pp. 1-8, Jun. 17, 2017 (Jun. 17, 2017), Retrieved from the Internet: URL: http://www.3gpp.org/ftp/tsg_ran/WG1_RL1/TSGR1_AH/NR_AH_1706/Docs/R1-1711174.zip.
Reinikainen A., "Performance Evaluation of LTE-Advanced Carrier Aggregation", AALTO University School of Electrical Engineering, Apr. 30, 2015 (Apr. 30, 2015), 89 Pages.
Roessler A., et al., "LTE-Advanced (3GPP Rel.12) Technology Introduction", White Paper, Rohde & Schwarz LTE-Advanced (3GPP Rel.12) Technology Introduction, 2009, pp. 1-60.
Huawei, et al., "SRS Symbol Positions for SRS Switching", 3GPP TSG RAN WGl Meeting #86, R1-166127, Aug. 26, 2016 (Aug. 26, 2016), 4 pages, the whole document.
Huawei, et al., "SRS Antenna Switching", 3GPP TSG RAN WG1 adhoc_NR_AH_1706, R1-1709938, Qingdao, China, Jun. 17, 2017, 4 Pages.

* cited by examiner

METHODS AND APPARATUS FOR SRS ANTENNA SWITCHING IN CARRIER AGGREGATION

CROSS-REFERENCE TO RELATED APPLICATION & PRIORITY CLAIM

This application claims benefit of and priority to U.S. Provisional Patent Application Ser. No. 62/544,648, filed Aug. 11, 2017, which is herein incorporated by reference in its entirety for all applicable purposes.

FIELD OF THE DISCLOSURE

Aspects of the present disclosure relate to communication systems and, more particularly, to methods and apparatus for improving performance for sounding reference signal (SRS) antenna switching in carrier aggregation (CA).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced ((LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a NR BS, 5G NB, a next generation NB (gNB), a transmission reception point (TRP), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes determining one or more band combinations that share an antenna switch. The UE sends a list of one or more bands in the one or more band combinations to a base station (BS).

Certain aspects provide a method for wireless communication by a BS. The method generally includes receiving, from a UE, a list of one or more bands of one or more band combinations that share an antenna switch. The BS schedules the UE based on the received list.

Certain aspects provide an apparatus for wireless communication, such as a UE. The apparatus generally includes means for determining one or more band combinations that share an antenna switch. The apparatus includes means for sending a list of one or more bands in the one or more band combinations to a BS.

Certain aspects provide an apparatus for wireless communication, such as a BS. The apparatus generally includes means for receiving, from a UE, a list of one or more bands of one or more band combinations that share an antenna switch. The apparatus includes means for scheduling the UE based on the received list.

Certain aspects provide an apparatus for wireless communication, such as a UE. The apparatus generally includes at least one processor coupled with a memory and configured to determine one or more band combinations that share an antenna switch. The apparatus includes a transmitter configured to send a list of one or more bands in the one or more band combinations to a BS.

Certain aspects provide an apparatus for wireless communication, such as a BS. The apparatus generally includes a receiver configured to receive, from a UE, a list of one or more bands of one or more band combinations that share an antenna switch. The apparatus includes at least one processor coupled with a memory and configured to schedule the UE based on the received list.

Certain aspects provide a computer readable medium having computer executable code stored thereon for wireless communication. The computer readable medium generally includes code for determining one or more band combinations that share an antenna switch. The computer readable medium includes code for sending a list of one or more bands in the one or more band combinations to a BS.

Certain aspects provide a computer readable medium having computer executable code stored thereon for wireless communication. The computer readable medium generally includes code for receiving, from a UE, a list of one or more bands of one or more band combinations that share an antenna switch. The computer readable medium includes code for scheduling the UE based on the received list.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
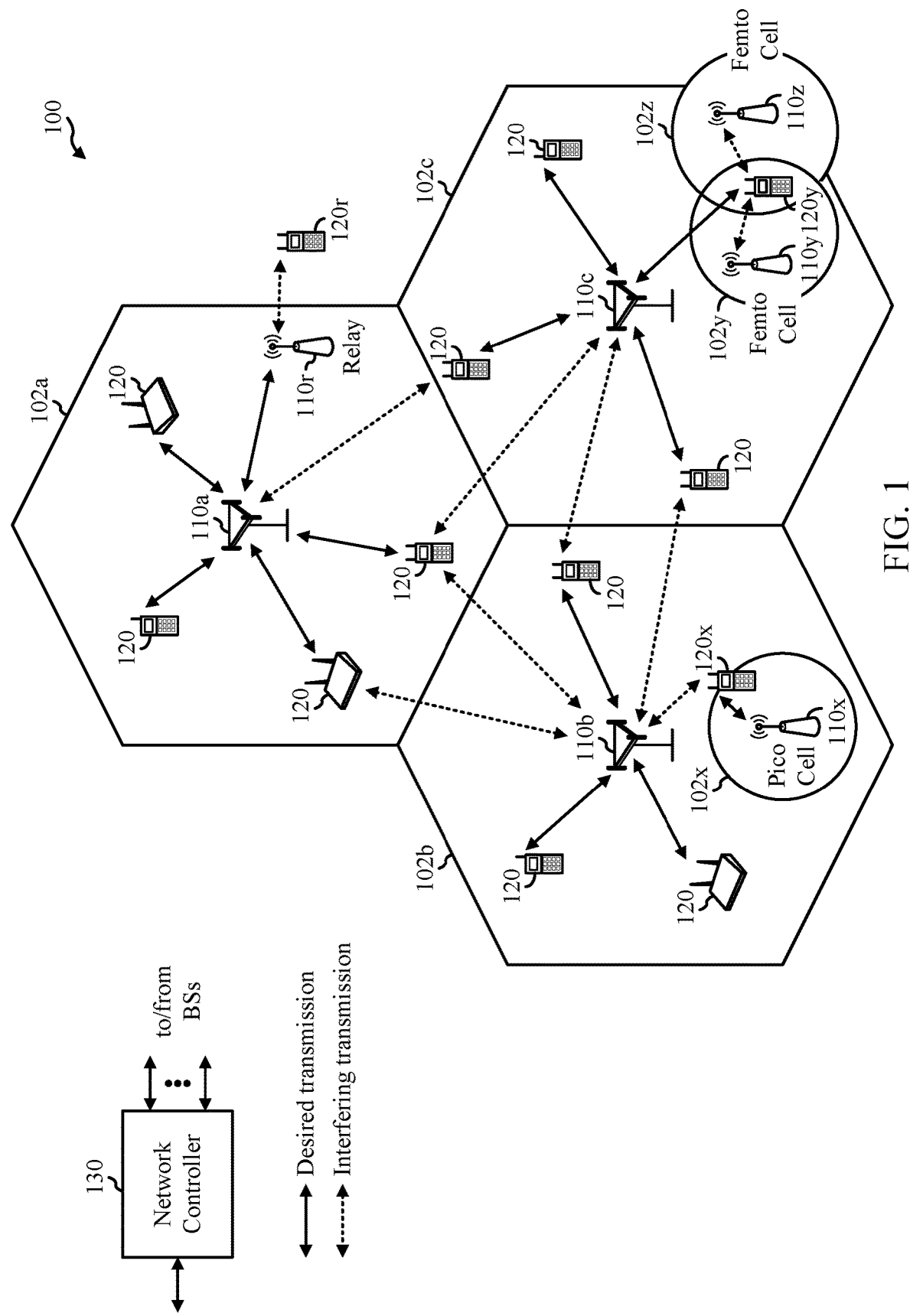
FIG. 1 is a block diagram conceptually illustrating an example telecommunications system, in accordance with certain aspects of the present disclosure.

Aspects of the present disclosure provide methods and apparatus for improving performance for sounding reference signal (SRS) antenna switching in carrier aggregation (CA). The SRS antenna switching may be for a time division duplexed (TDD) component carrier (CC) (e.g., band) and a shared switch or a shared filter on the transmit or receive side, or both, may affect communications on another CC (e.g., configured for frequency division duplexing (FDD) or 5G communications) configured for CA with the TDD CC and that shares the antenna switch with the TDD CC. According to certain aspects, the user equipment (UE) can determine bands that can be affected by the SRS antenna switch and send a list of the affected bands to the base station (BS). The BS can use the list of affected bands to determine scheduling for the UE, for example, to avoid or mitigate the effect of antenna switching on those bands. For example, the BS can schedule SRS switching in special subframes only, refrain from scheduling SRS switching in affected subframes/band combinations, schedule SRS switching to be aperiodic or at a reduced periodicity, avoid scheduling transmissions in affected subframes, schedule shorter TTIs in those subframes, and/or scheduling a particular modulation scheme or data pattern for those subframes.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality Example Wireless Communications System FIG. 1 illustrates an example wireless communication network 100, such as a new radio (NR) or 5G network, in which aspects of the present disclosure may be performed, for example, for improving performance for sounding reference signal (SRS) antenna switching in carrier aggregation (CA) as described in more detail below.

A user equipment (UE) 120 may be configured for CA and SRS antenna switching for a time division duplexed (TDD) component carrier (CC) (e.g., band). The antenna switch may affect communications on another CC (e.g., configured for frequency division duplexing (FDD) or 5G communications) configured for CA with the TDD CC and that shares the antenna switch with the TDD CC. According to certain aspects, the UE 120 can determine bands affected (e.g., potentially affected) by the SRS antenna switch (e.g., bands that share the antenna switch) and send a list of the affected bands to a base station (BS) 110. The BS 110 can use the list of affected bands to determine scheduling for the UE 120, for example, to avoid or mitigate the effect of antenna switching on those bands.

As illustrated in FIG. 1, the wireless communication network 100 may include a number of BSs 110 and other network entities. A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and NR BS, next generation NB (gNB), transmission reception point (TRP), etc., may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless communication network 100 through various types of backhaul interfaces such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a tone, a subband, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved/enhanced MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. For example, a scheduling entity (e.g., a base station) allocates resources for communication among some or all devices and equipment within its service area or cell. The scheduling entity may be responsible for scheduling, assigning, reconfiguring, and releasing resources for one or more subordinate entities. In some examples, for scheduled communication, subordinate entities utilize resources allocated by the scheduling entity. BSs are not the only entities that may function as a scheduling entity. For examples, a UE may function as a scheduling entity and may schedule resources for one or more subordinate entities (e.g., one or more other UEs) and the other UEs utilize the resources scheduled by the UE for wireless communication. A UE may function as a scheduling entity in a peer-to-peer (P2P) network, and/or in a mesh network. In a mesh network example, UEs may communicate directly with one another in addition to communicating with the scheduling entity. Thus, in a wireless communication network with a scheduled access to time-frequency resources and having a cellular configuration, a P2P configuration, and a mesh configuration, a scheduling entity and one or more subordinate entities may communicate utilizing the scheduled resources.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Figure 2:
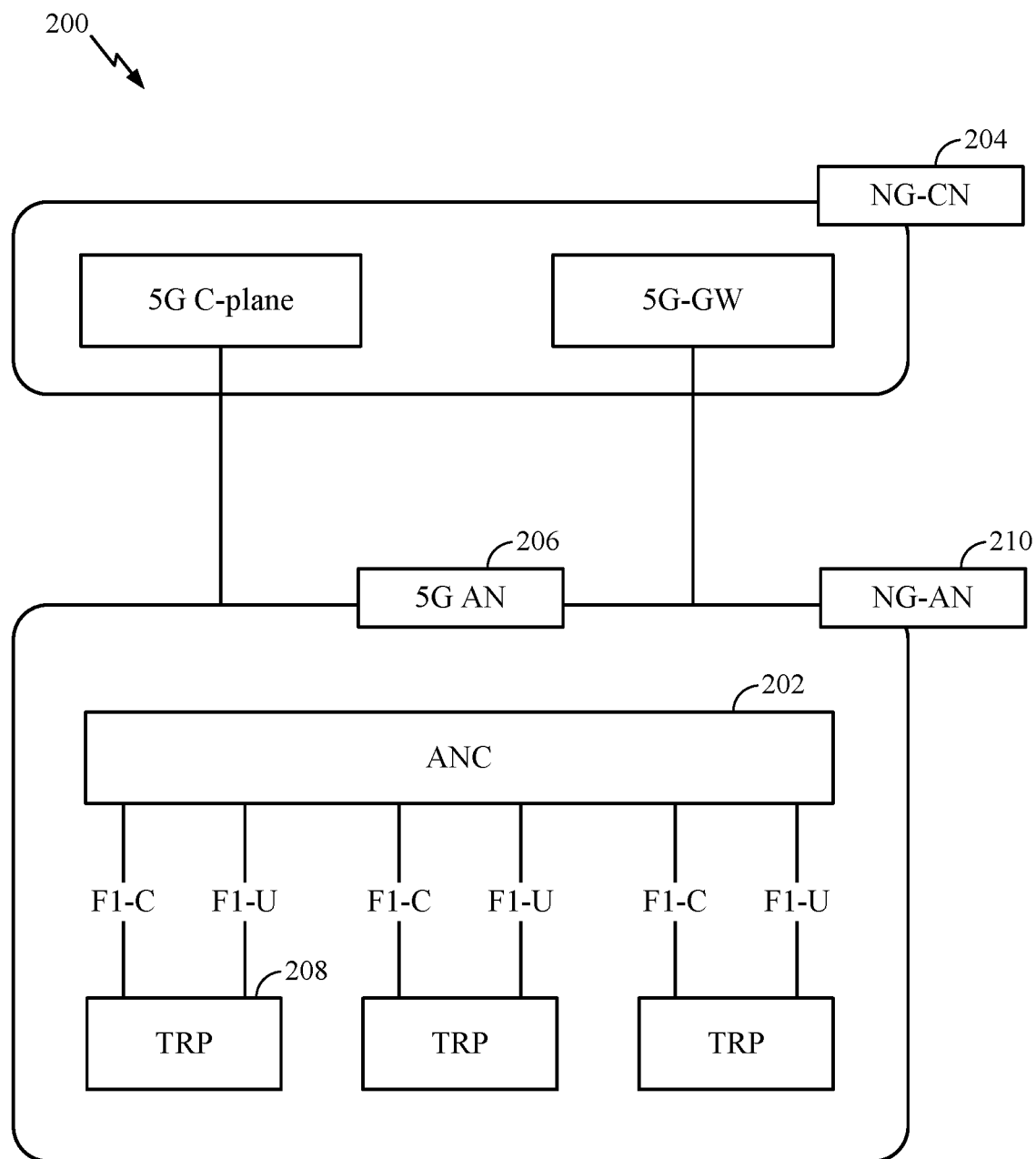
FIG. 2 is a block diagram illustrating an example logical architecture of a distributed radio access network (RAN), in accordance with certain aspects of the present disclosure.

FIG. 2 illustrates an example logical architecture 200 of a distributed radio access network (RAN), which may be implemented in the wireless communication network 100 illustrated in FIG. 1. A 5G access node 206 may include an access node controller (ANC) 202. The ANC 202 may be a CU of the distributed RAN. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (e.g., cells, BSs, gNBs, etc.).

The TRPs 208 may be a DU. The TRPs 28 may be connected to a single ANC (e.g., ANC 202) or more than one ANC (not illustrated). For example, for RAN sharing, radio as a service (RaaS), and service specific AND deployments, the TRP 208 may be connected to more than one ANC. A TRP may include one or more antenna ports. The TRPs 208 may be configured to individually (e.g., dynamic selection) or jointly (e.g., joint transmission) serve traffic to a UE.

The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. For example, the NG-AN 210 may support dual connectivity with NR and may share a common fronthaul for LTE and NR.

The logical architecture 200 may enable cooperation between and among TRPs 208. For example, cooperation may be preset within a TRP and/or across TRPs via the ANC 202. No inter-TRP interface may be present.

Logical functions may be dynamically distributed in the logical architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
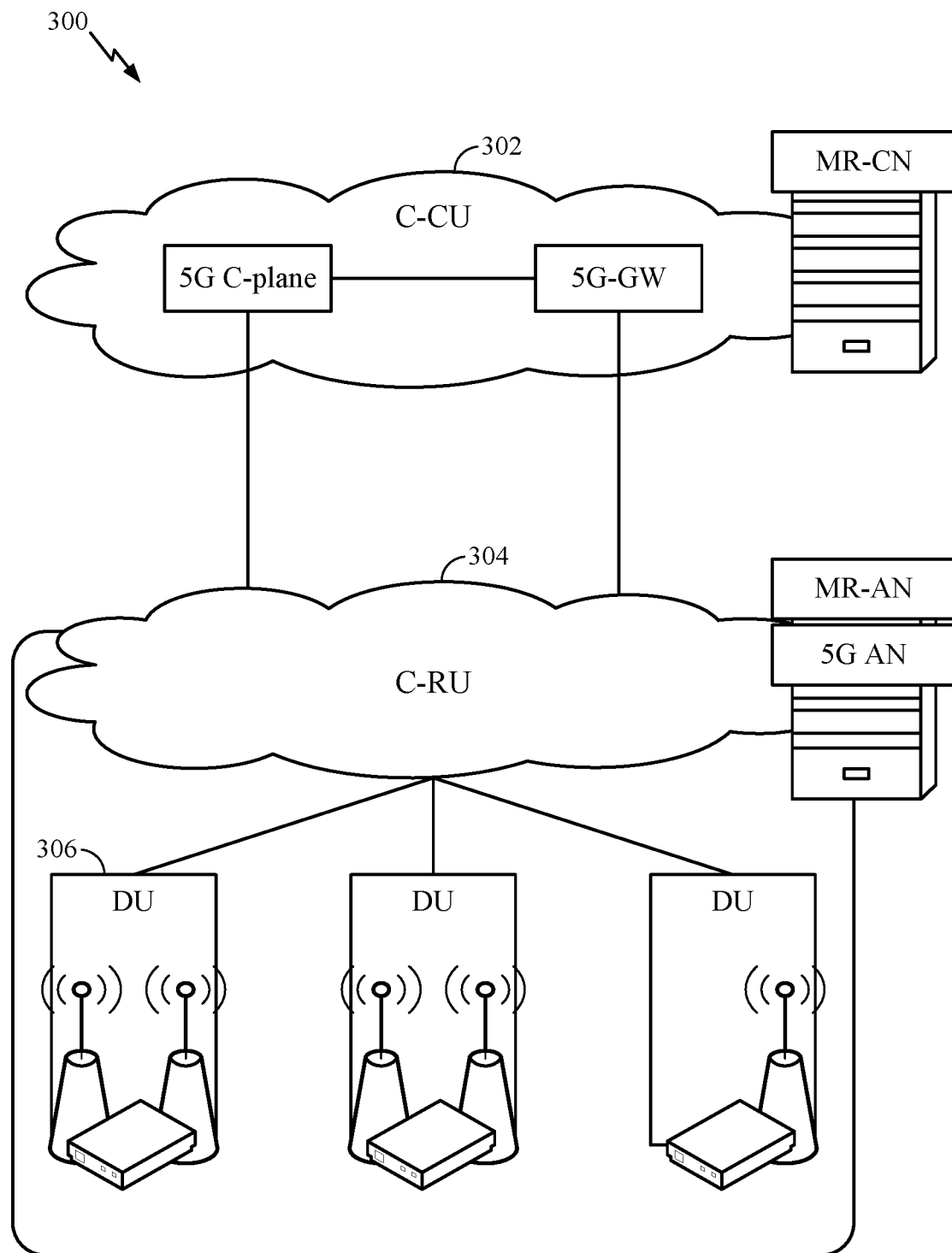
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. In some examples, the C-RU 304 hosts core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
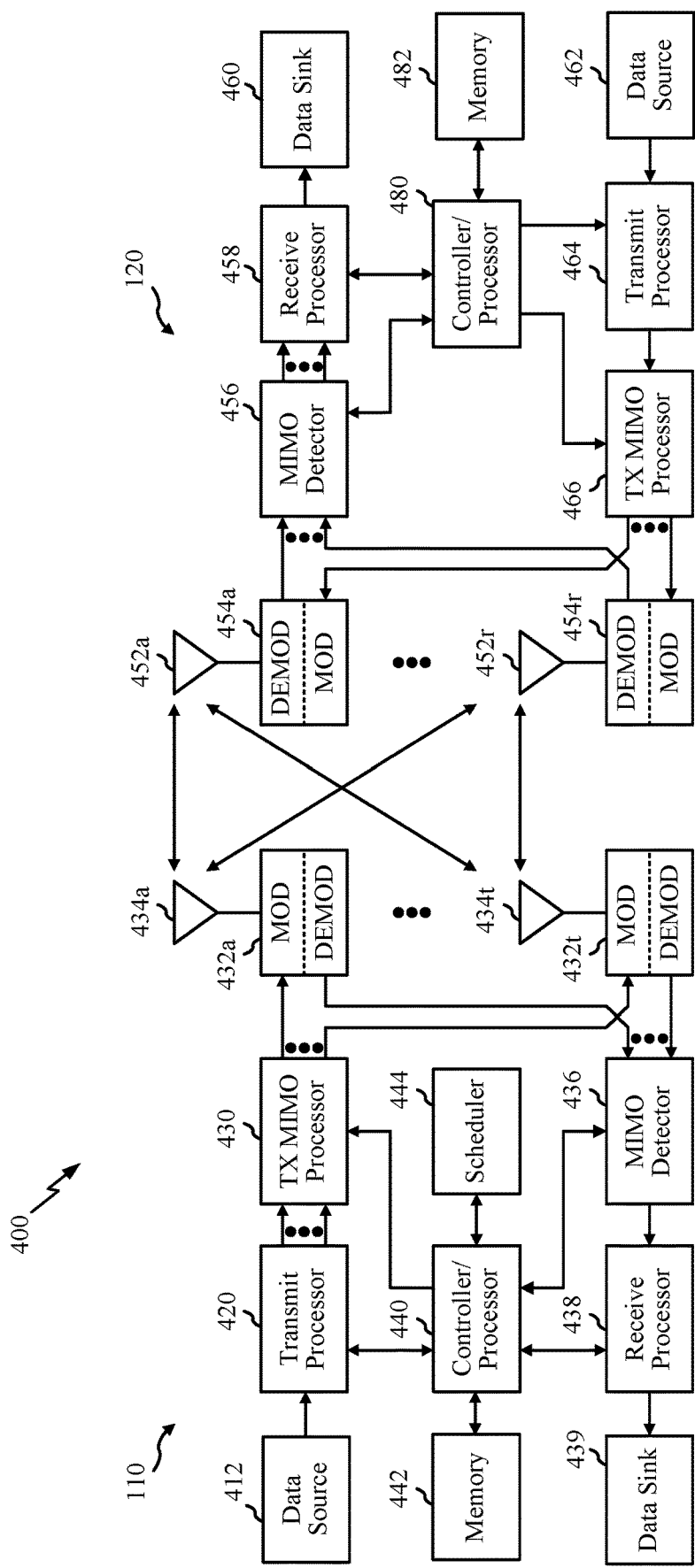
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure, such as the operations described herein and illustrated with reference to FIG. 11 and FIG. 12.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The transmit processor 420 may process (e.g., encode and symbol map) the data and control information to obtain data symbols and control symbols, respectively. The transmit processor 420 may also generate reference symbols, such as for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal (RS). The symbols from the transmit processor 464 may be precoded by a TX MIMO processor 466 if applicable, further processed by the modulators 454a through 454r (e.g., for SC-FDM, etc.), and transmitted to the BS 110. At the BS 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of the functional blocks illustrated in FIG. 12, and/or other processes for the techniques described herein. The processor 480 and/or other processors and modules at the UE 120 may also perform or direct, e.g., the execution of the functional blocks illustrated in FIG. 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
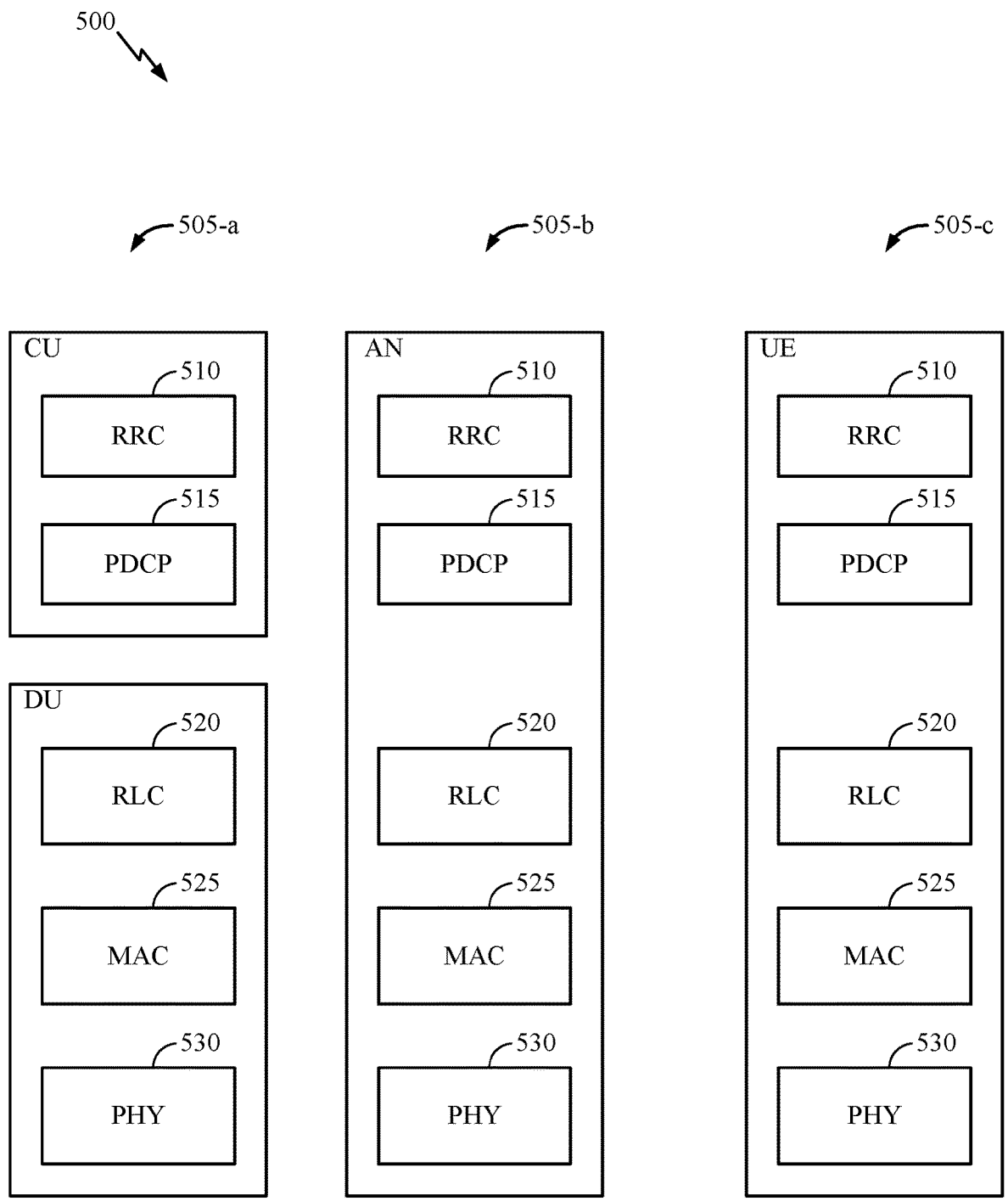
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system (e.g., wireless communication network 100), such as in an NR system. Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, the RRC layer 510, the PDCP layer 515, the RLC layer 520, the MAC layer 525, and the PHY layer 530 may each be implemented by the AN. The second option 505-b may be useful, for example, in a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
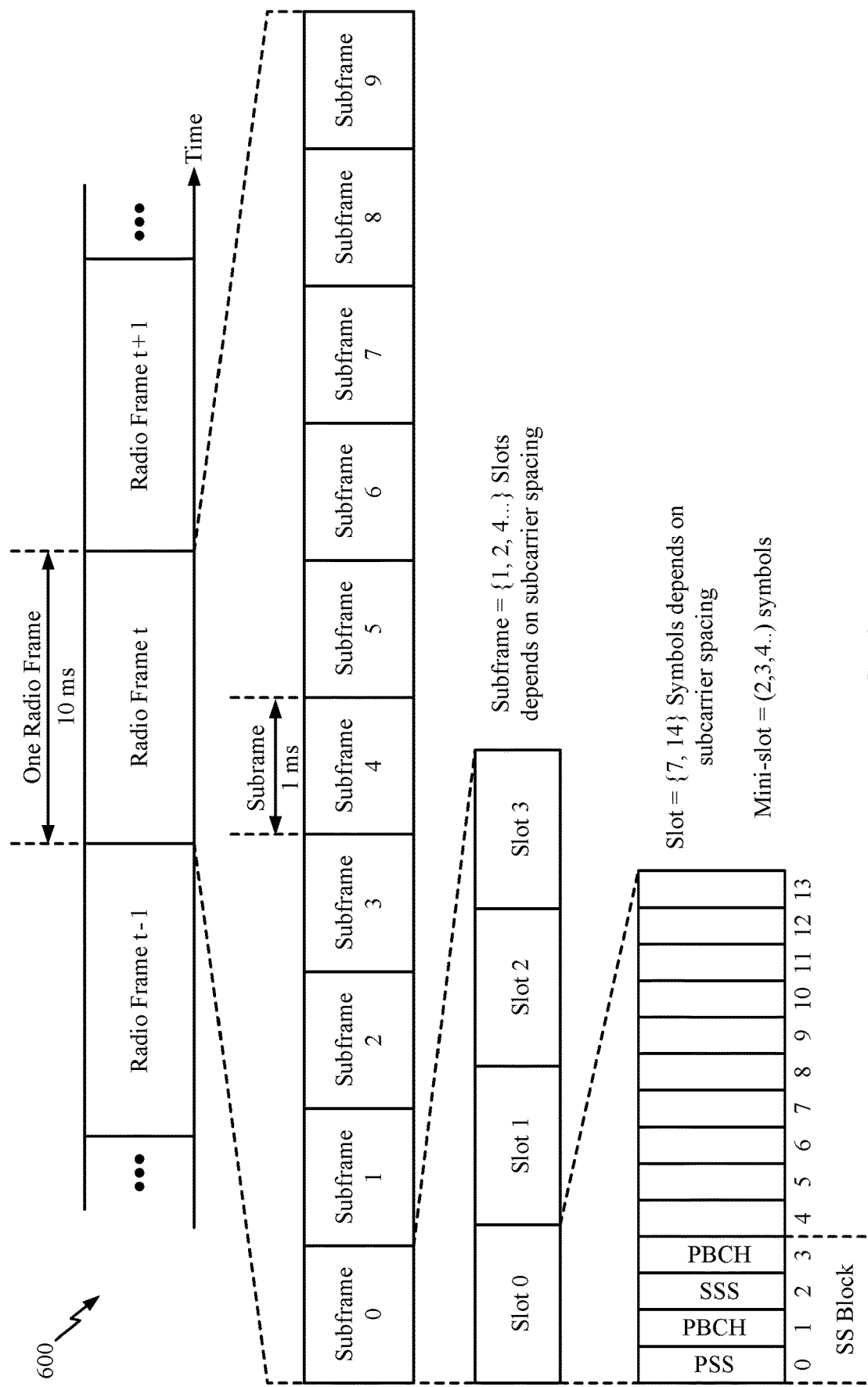
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information (SI), such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a PDSCH in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Carrier Aggregation

Figure 8:
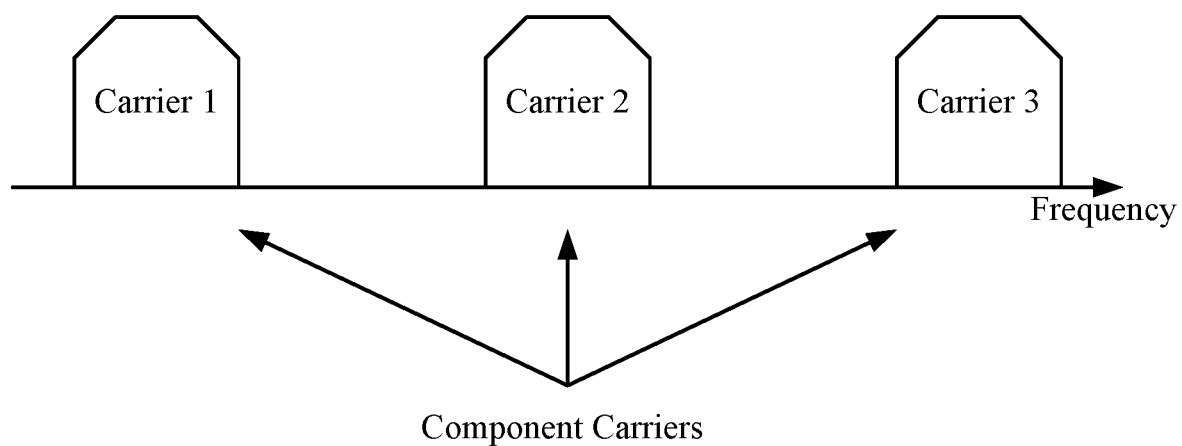
FIG. 8 illustrates an example non-contiguous CA type, according to aspects of the present disclosure.
Figure 9:
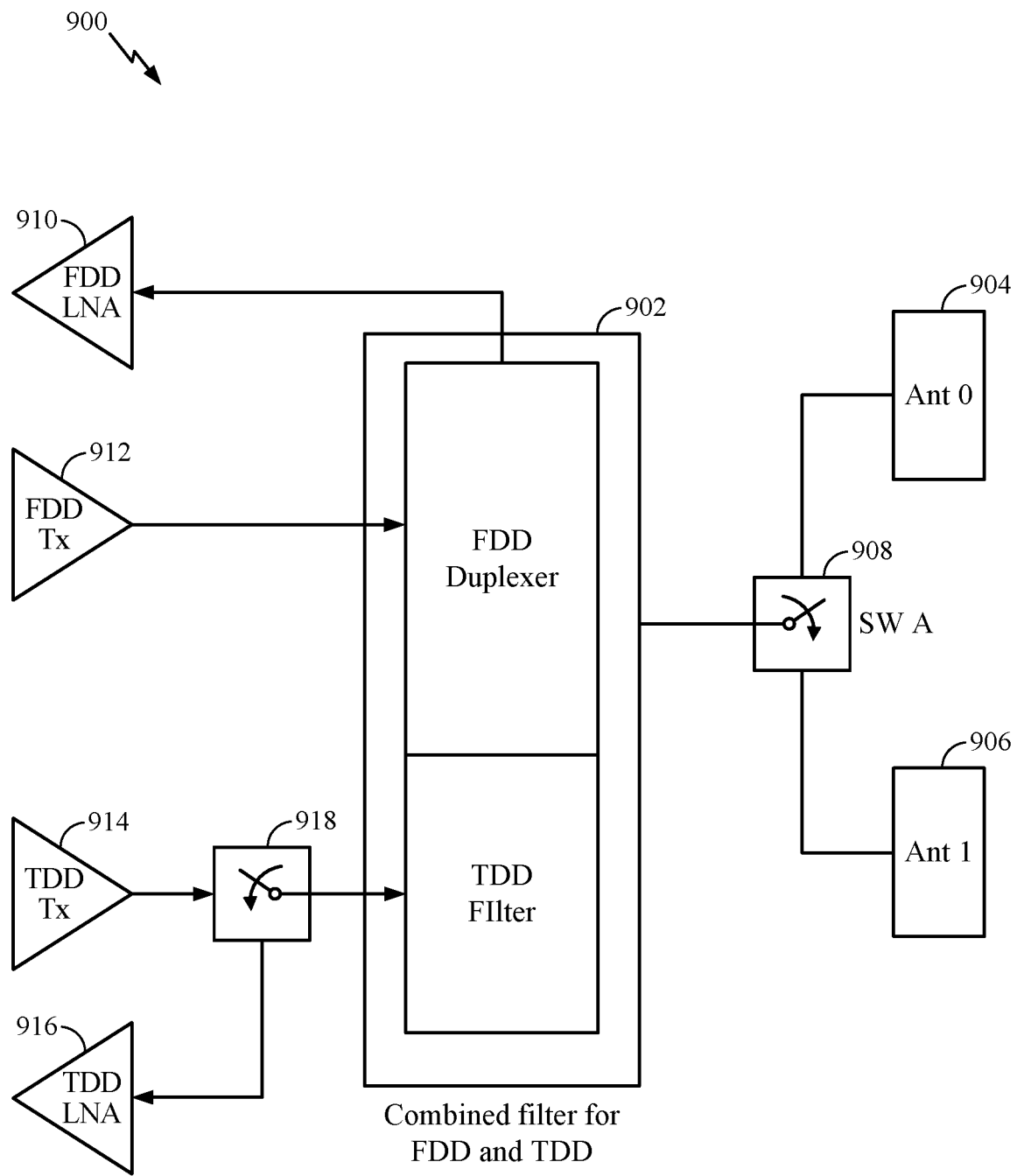
FIG. 9 is block diagram illustrating an example UE architecture with shared components for some frequency bands, in accordance with certain aspects of the present disclosure.

Carrier aggregation (CA) is used in certain systems (e.g., LTE-Advanced) in order to increase the bandwidth, and thereby increase the bitrate. CA can be used for both FDD and TDD. FIGS. 8 and 9 illustrate examples of FDD CA. Each aggregated carrier is referred to as a component carrier (CC).

Figure 7:
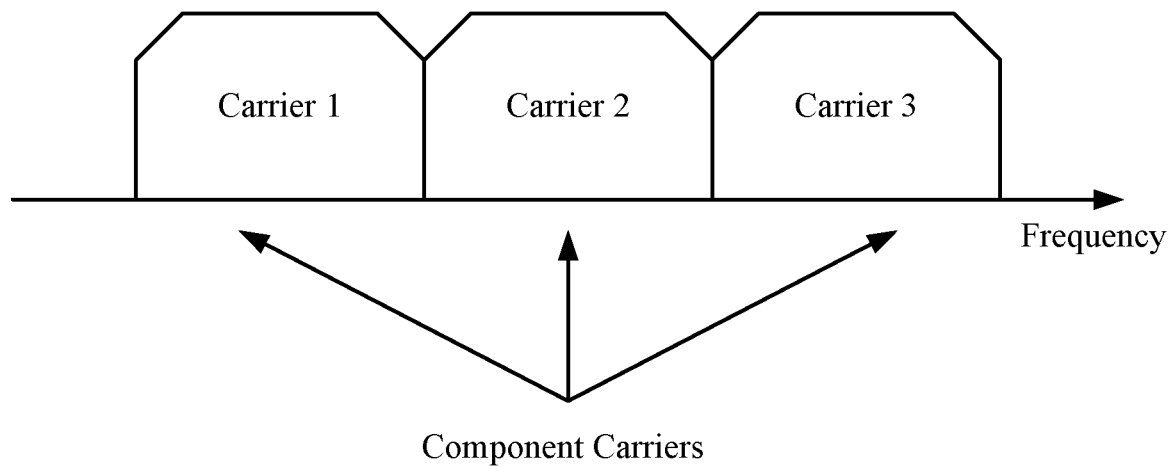
FIG. 7 illustrates an example contiguous carrier aggregation (CA) type, according to aspects of the present disclosure.

In certain systems (e.g., LTE-Advanced), UEs may use spectrum of up to 20 MHz bandwidths allocated in a carrier aggregation of up to a total of 100 MHz (5 CCs) used for transmission in each direction. Two types of CA include contiguous CA and non-contiguous CA. In contiguous CA, multiple available CCs are adjacent to each other as shown in FIG. 7. In non-contiguous CA multiple available CCs are separated along the frequency band as shown in FIG. 9. Both non-contiguous and contiguous CA aggregate multiple CCs to serve a single UE.

In some cases, a UE operating in a multicarrier system (a system supporting CA) can be configured to aggregate certain functions of multiple carriers, such as control and feedback functions, on the same carrier, which may be referred to as a "primary carrier" (PCC). The remaining carriers that depend on the primary carrier for support are referred to as associated secondary carriers (SCC).

Aggregated CCs may be intra-band—CCs within the same operating frequency band or can be inter-band, in which case the CCs belong to different operating frequency bands.

According to certain aspects, TDD and FDD carriers can be jointly aggregated. TDD-FDD CA may allow the network to boost user throughput by aggregating both TDD and FDD for the same UE. TDD-FDD CA may allow the load to be divided between the TDD and FDD frequencies. TDD-FDD CA allows CA to be applied even when the spectrum is allocated in both TDD and FDD bands. Thus, the benefits of CA (e.g., flexibility and efficient resource utilization) can be achieved for TDD and FDD bands.

According to certain aspects, CA can be applied jointly to LTE TDD bands and bands configured to 5G communications.

Example Methods and Apparatus for SRS Antenna Switching in CA

In some communications systems (e.g., long term evolution (LTE) and/or new radio (NR) systems), the frequency spectrum may include bands configured for time division duplexing (TDD) and bands configured for frequency division duplexing (FDD). Certain systems, such as NR systems (e.g., wireless communication network 100) may also include bands configured for NR (e.g., 5G) communications. As described above, carrier aggregation (CA) may be configured jointly for TDD and FDD or 5G configured bands.

In some cases, front end (FE) components in a device, such as a user equipment (UE), are shared. For example, some FE components may be shared between TDD bands and FDD band, and/or shared between LTE configured bands and 5G configured bands. For example, the FE components could be shared by a TDD tx and FDD Rx, by the TDD Tx and a FDD Tx, or by the TDD Tx, FDD Rx, and FDD Tx. FIG. 9 is block diagram illustrating an example UE architecture 900 with shared components for some frequency bands, in accordance with certain aspects of the present disclosure. As shown in FIG. 9, the UE architecture 900 includes a combined FDD and TDD filter 902. The combined FDD and TDD filter 902 has a single output to the antenna ports 904 (Ant0) and 906 (Ant1) to support CA. The FDD bands (e.g., FDD LNA 910 and FDD Tx 912) and TDD bands (e.g., TDD Tx 914 and TDD LNA 916) may share all of the FE components following the combined FDD and TDD filter 902. It is noted that while FIG. 9 shows one example of the UE architecture, other UE architectures may be used within the scope of this disclosure. For example, although FIG. 9 illustrates shared components for FDD and TDD bands, in other examples, a UE architecture may include shared components for TDD bands and 5G communication bands.

The UE may be configured for antenna switching/selection. In some examples, the UE is configured for sounding reference signal (SRS) switching (e.g., antenna selection) for the TDD bands for uplink transmission. The UE may switch between the antenna ports 904 and 906 using the antenna switch 908 (SW A). Because the antenna switch 908 is shared by the TDD and FDD bands, when the antenna switch 908 switches antennas, for example from antenna 904 to antenna 906 or from antenna 906 to antenna 904, the antenna is switched for the FDD band also.

Figure 10:
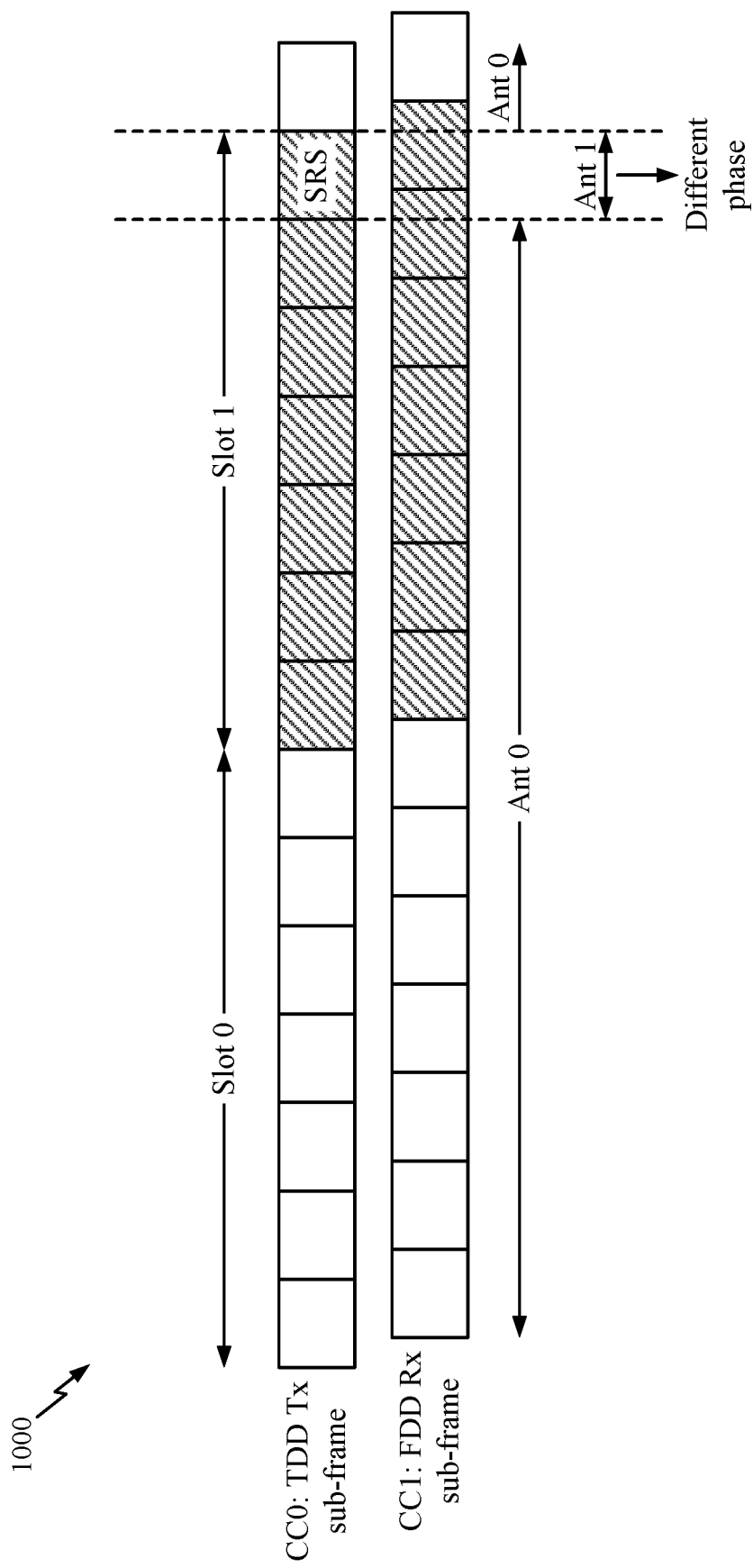
FIG. 10 illustrates example sounding reference signal (SRS) antenna switching in a subframe, in accordance with certain aspects of the present disclosure.

The SRS antenna switching for the TDD band(s) may result in a performance loss for the other band sharing the antenna, i.e., the FDD or 5G band. For example, an uplink or downlink communication on the FDD or 5G band may be affected by the SRS antenna switching for the TDD band. SRS may be transmitted in the last symbol of a subframe. SRS antenna switching can be performed periodically. For a different CA band (e.g., the FDD or 5G configured band), the last symbol in the subframe could be scheduled on a different antenna; thus, the communication for that symbol may be interrupted by the SRS antenna switching for the TDD band. In the case of a timing advance (TA) for the other band (e.g., the FDD or 5G band), two symbols could be affected by the SRS antenna switching for the TDD band. As shown in FIG. 10, the CC0 is configured as a TDD band and the CC1 is configured as a FDD band with a TA relative to the TDD band. As shown in FIG. 10, the antenna is switched from the antenna 0 to the antenna 1 for transmission of SRS on the CC0 configured for TDD in the last symbol of the subframe. As shown in FIG. 10, due to the TA, the symbol boundaries for the CC0 and CC1 are not aligned and, therefore, the antenna switch in the last symbol of CC0 affects the last two symbols of the CC1.

Due to different channel conditions between the switched antennas (e.g., Ant 0 and Ant 1), the phase of the affected symbols (e.g., in the FDD CC1) may be different than the phase of the other symbols in that subframe. The phase difference may result in increased block error rate (BLER), which could affect throughput (e.g., DL throughput for the DL Rx subframe of CC1). In some cases, only particular FDD bands that are aggregated with particular TDD bands will be affected by the antenna switching. Thus, it may be desirable for the BS to know of the bands that could be affected by antenna switching.

Aspects of the present disclosure provide methods for improved performance for SRS switching in CA. According to certain aspects, the UE determines bands that can be affected by the SRS antenna switching and sends a list of the affected bands to the BS. These lists could be for various band combinations, such as TDD Tx and FDD Rx, TDD Tx and FDD Tx, and/or TDD Tx and FDD Rx and Tx. The BS can use the list of affected bands to determine (e.g., optimize) scheduling for the UE, for example, to avoid or mitigate the effects of antenna switching on those bands.

Figure 11:
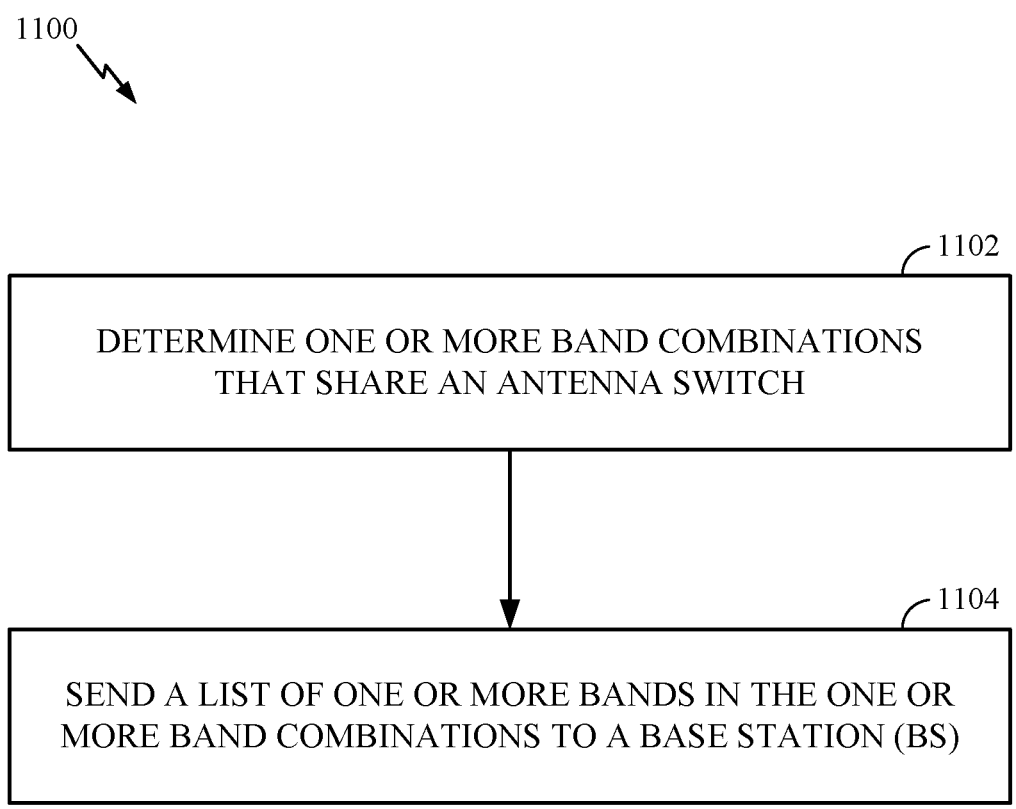
FIG. 11 illustrates example operations for wireless communications performed by a UE, in accordance with certain aspects of the present disclosure.

FIG. 11 illustrates example operations 1100 for wireless communications, in accordance with aspects of the present disclosure. Operations 1100 may be performed by a UE, for example, such as a UE 120 in the wireless communication network 100 shown in FIG. 1.

Operations 1100 begin, at block 1102, by determining one or more band combinations (e.g., TDD+FDD CA and/or TDD+5G CA configured band combinations) that share an antenna switch. The bands may be for uplink, downlink, or both uplink and downlink. The bands may share other components such as a filter. The shared filter can be for the receiver, transmitter, or both between the bands.

At block 1104, the UE sends a list of one or more bands in the one or more band combinations to a BS. For example, for each uplink band, the UE can send a list of all bands having an uplink communication affected by antenna switching and/or a list of all bands having a downlink communication affected by antenna switching. For each uplink band (e.g., configured for TDD), the UE can send a list of all bands configured for CA with that band.

According to certain aspects, the UE can decide whether to support antenna switching for the one or more bands in the list of one or more band combinations. For example, the UE can decide to ignore (e.g., not obey) an antenna selectivity command. Thus, the UE may refrain from performing antenna switching for the one or more band combinations in certain subframes. According to certain aspects, the UE can send the BS an indication of the decision. For example, the UE can send the indication in the list, indicating whether antenna selection is supported. Alternatively, the UE can send the indication of the decision separately from the list. Alternatively, the UE can the indication of the decision rather than sending the list.

According to certain aspects, the UE can report the list of the affected bands and/or the decision of whether antenna selection is supported for the bands at initialization of the UE or after (e.g., in response to) the UE is assigned the band combinations. The UE may report the information at another time.

In some examples, for each band combination, the UE signals which bands support Tx antenna selection. For each of the uplink bands that support Tx antenna selection, the UE signals all the bands for which the UL switches together (e.g., for which the same port has to be enforced) and/or all the bands for which DL switches together (e.g., introducing a "glitch" in the DL reception).

According to certain aspects, the UE may receive scheduling information from the BS based on the list of bands provided to the BS, as described in more detail below.

Figure 12:
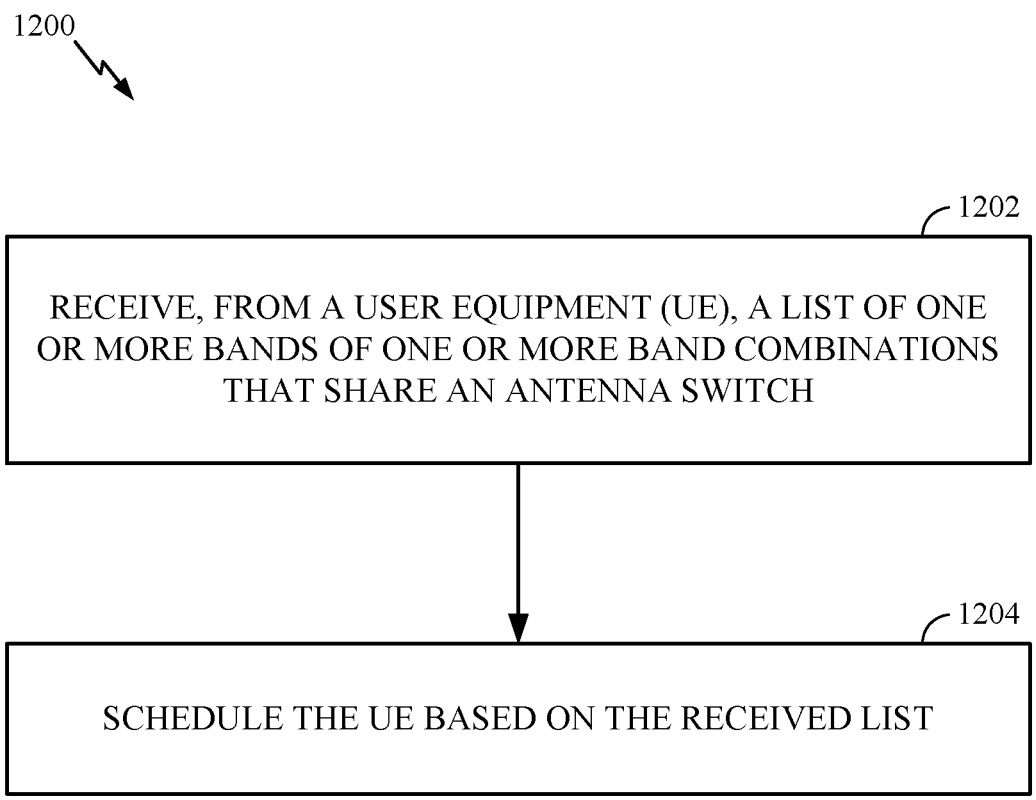
FIG. 12 illustrates example operations for wireless communications performed by a BS, in accordance with certain aspects of the present disclosure.

FIG. 12 illustrates example operations 1200 for wireless communications, in accordance with aspects of the present disclosure. Operations 1200 may be performed by a BS, for example, such as a BS 110 in the wireless communication network 100 shown in FIG. 1. Operations 1200 may be complementary operations by the BS to the operations 1100 performed by the UE.

Operations 1200 begin, at block 1202, by receiving, from a UE, a list of one or more bands of one or more band combinations that share an antenna switch.

At block 1204, the BS schedules the UE based on the received list. For example, the BS may avoid scheduling the UE in collision subframes in which the one or more band combinations are configured for communicating (e.g., and in which SRS antenna switching occurs).

In another example, the BS can schedule shorter transmission time intervals (TTIs) in the collision subframes. For example, if the UE supports a shortened TTI (sTTI), the BS can schedule sTTI (e.g., 1.14 ms) for those affected subframes/band combinations. If sTTI is assigned in the collision subframes, then in some cases only one of six possible sTTI might be lost.

According to certain aspects, the BS may reduce the rate of SRS antenna switching to reduce outage. For example, the BS may schedule the UE for multiple antenna switching for SRS only in special subframes (e.g., TDD subframe configuration "special" subframes). Alternatively, the BS may schedule the UE for aperiodic SRS antenna switching. The BS may schedule the UE for SRS antenna switching at a reduced periodicity. In another example, the BS may refrain from scheduling the UE for SRS antenna switching (e.g., in the collision subframes and/or for certain band combinations).

In another example, the BS may schedule UE with a modulation scheme and/or data that is more robust, to mitigate the effect of the affected (e.g., lost) symbols. For example, even at a lower data rate, overall throughput can be increased if a lower modulation scheme or a specific data patterns is used for those subframes with collision.

Advantageously, techniques provided herein may enable an apparatus (e.g., a BS, such as a NB, gNB, etc.) to intelligently schedule a UE based on information received from the UE regarding bands and/or band combinations affected by SRS antenna switching. Further aspects provide for the UE and/or BS to decide whether or not SRS antenna switching should be performed (e.g., supported/scheduled) at all for the subframes/bands affected by the SRS antenna switching. Thus, performance can be improved, such as a higher throughput.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11 and 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining one or more band combinations that switch together to a second antenna port when at least one band in a band combination is switched from a first antenna port to the second antenna port; and sending a list to a base station (BS) of one or more bands in the one or more band combinations that are affected by switching from the first antenna port to the second antenna port for one or more uplink bands in the one or more band combinations and the one or more uplink bands.

2. The method of claim 1, wherein sending the list comprises, for each uplink band in the one or more band combinations, sending a list of all uplink bands in the one or more band combinations affected by transmit antenna switching.

3. The method of claim 1, wherein sending the list comprises, for each uplink band in the one or more band combinations, sending a list of all downlink bands in the one or more band combinations affected by transmit antenna switching for the uplink band.

4. The method of claim 1, further comprising:
deciding whether to support transmit antenna switching for the one or more band combinations, wherein
the list includes an indication to the BS of the decision.

5. The method of claim 1, wherein at least one of the one or more band combinations comprises a first band configured for time division duplexing (TDD) uplink communication using a first transmit and receive chain and a second band configured for frequency division duplexing (FDD) or 5G communication using a second transmit and receive chain, and wherein the first and second transmit and receive chains share the antenna switch.

6. The method of claim 5, further comprising:
switching, via the antenna switch, from the first antenna port to the second antenna port for transmitting a sounding reference signal (SRS), on at least one uplink band configured for TDD.

7. The method of claim 5, wherein determining the one or more band combinations comprises determining one or more downlink FDD bands configured for carrier aggregation (CA) with one or more uplink bands configured for TDD.

8. The method of claim 7, wherein sending the list comprises, for each band configured for TDD, sending a list of the bands configured for CA with that band configured for TDD.

9. The method of claim 1, wherein sending the list comprises sending the list at initialization of the UE or in response to the UE receiving an assignment of the one or more band combinations.

10. The method of claim 1, further comprising:
receiving scheduling information from the BS based on the list.

11. The method of claim 1, further comprising:
refraining from performing transmit antenna switching for the one or more band combinations.

12. A method for wireless communications by a base station (BS), comprising:
receiving, from a user equipment (UE), a list of one or more bands in one or more band combinations affected by switching together to a second antenna port, when at least one of the one or more bands in the one or more band combinations switches from a first antenna port to the second antenna port, for one or more uplink bands in the one or more band combinations and the one or more uplink bands; and
scheduling the UE based on the received list.

13. The method of claim 12, wherein the received list comprises, for each uplink band in the one or more band combinations, a list of all uplink bands in the one or more band combinations having an uplink communication affected by transmit antenna switching.

14. The method of claim 12, wherein the received list comprises, for each uplink band in the one or more band combinations, a list of all downlink bands in the one or more band combinations having a downlink communication affected by transmit antenna switching for the uplink band.

15. The method of claim 12, wherein the received list includes an indication to the BS of a decision regarding whether transmit antenna switching is supported for the one or more bands in the one or more band combinations.

16. The method of claim 12, wherein at least one of the one or more band combinations comprises a first band configured for time division duplexing (TDD) uplink communication using a first transmit and receive chain and a second band configured for frequency division duplexing (FDD) or 5G communication using a second transmit and receive chain, and wherein the first and second transmit and receive chains share the antenna switch.

17. The method of claim 16, wherein the one or more band combinations comprises one or more downlink FDD bands configured for carrier aggregation (CA) with the one or more bands configured for TDD.

18. The method of claim 12, wherein scheduling the UE based on the received list comprises avoiding scheduling the UE in subframes in which the one or more band combinations are configured for communicating.

19. The method of claim 12, further comprising:
determining whether the UE supports a shortened transmission time interval (sTTI), wherein
scheduling the UE based on the received list comprises scheduling the sTTI for communications in subframes in which the one or more band combinations are configured for communicating.

20. The method of claim 12, wherein scheduling the UE based on the received list comprises, based on the received list, selecting at least one of: a modulations scheme or data pattern for scheduling in subframes in which the one or more band combinations are configured for communicating.

21. The method of claim 12, wherein scheduling the UE based on the received list comprises scheduling the UE for multiple transmit antenna switching for sounding reference signal (SRS) transmission only in special subframes.

22. The method of claim 12, wherein scheduling the UE based on the received list comprises scheduling the UE for aperiodic transmit antenna switching for sounding reference signal (SRS) transmission.

23. The method of claim 12, wherein scheduling the UE based on the received list comprises scheduling the UE for transmit antenna switching for sounding reference signal (SRS) transmission at a reduced periodicity based on the received list.

24. The method of claim 12, wherein scheduling the UE based on the received list comprises refraining from scheduling the UE for transmit antenna switching for sounding reference signal (SRS) transmission for the one or more bands.

25. An apparatus for wireless communications by a user equipment (UE), comprising:
means for determining one or more band combinations that switch together to a second antenna port when at least one band in a band combination is switched from a first antenna port to the second antenna port; and
means for sending a list to a base station (BS) of one or more bands in the one or more band combinations that are affected by switching from the first antenna port to the second antenna port for one or more uplink bands in the one or more band combinations and the one or more uplink bands.

26. The apparatus of claim 25, wherein sending the list comprises, for each uplink band in the one or more band combinations, sending a list of all uplink bands in the one or more band combinations having an uplink communication affected by transmit antenna switching.

27. The apparatus of claim 25, wherein sending the list comprises, for each uplink band in the one or more band combinations, sending a list of all downlink bands in the one or more band combinations having a downlink communication affected by transmit antenna switching for the uplink band.

28. An apparatus for wireless communications by a base station (BS), comprising:
means for receiving, from a user equipment (UE), a list of one or more bands in one or more band combinations affected by switching together to a second antenna port, when at least one of the one or more bands in the one or more band combinations switches from a first antenna port to the second antenna port, for one or more uplink bands in the one or more band combinations and the one or more uplink bands; and
means for scheduling the UE based on the received list.

29. The apparatus of claim 28, wherein the received list comprises, for each uplink band in the one or more band combinations, a list of all uplink bands in the one or more band combinations having an uplink communication affected by transmit antenna switching.

30. The apparatus of claim 28, wherein the received list comprises, for each uplink band in the one or more band combinations, a list of all downlink bands in the one or more band combinations having a downlink communication affected by transmit antenna switching for the uplink band.

* * * * *